(12) United States Patent
Shideler et al.

(10) Patent No.: US 6,625,163 B1
(45) Date of Patent: Sep. 23, 2003

(54) COLLISION DETECTION ON A DIFFERENTIAL BUS

(75) Inventors: Ronald K. Shideler, Calgary (CA); Edwin Iun, Calgary (CA)

(73) Assignee: Nortel Networks Ltd., St. Laurent (CA)

( * ) Notice: Subject to any disclaimer, the term of this patent is extended or adjusted under 35 U.S.C. 154(b) by 0 days.

(21) Appl. No.: 09/295,714

(22) Filed: Apr. 21, 1999

(51) Int. Cl.[7] .......................................... H04L 12/413
(52) U.S. Cl. .................... 370/445; 370/449; 370/230
(58) Field of Search ................................. 370/229, 257, 370/338, 342, 367, 362, 365, 397, 421, 423, 438, 445, 446, 447, 448, 451, 454; 709/253

(56) References Cited

U.S. PATENT DOCUMENTS

| | | | | | |
|---|---|---|---|---|---|
| 4,807,109 A | * | 2/1989 | Farrell et al. | ................ | 713/401 |
| 4,807,223 A | * | 2/1989 | Wells | .......................... | 370/447 |
| 4,965,792 A | * | 10/1990 | Yano | ........................... | 370/445 |
| 5,113,498 A | * | 5/1992 | Evan et al. | ..................... | 710/8 |
| 5,297,141 A | * | 3/1994 | Marum | ........................ | 370/445 |
| 5,335,226 A | * | 8/1994 | Williams | ..................... | 370/445 |
| 5,412,644 A | * | 5/1995 | Herberle | ..................... | 370/445 |
| 5,446,735 A | * | 8/1995 | Tobagi et al. | ................ | 370/445 |
| 5,726,976 A | * | 3/1998 | Thompson et al. | ......... | 370/229 |
| 5,784,573 A | * | 7/1998 | Szczepanek et al. | ........ | 370/463 |
| 5,790,603 A | * | 8/1998 | Maeda et al. | ................ | 375/316 |
| 5,818,842 A | * | 10/1998 | Burwell et al. | ............. | 370/250 |
| 5,974,051 A | * | 10/1999 | De Nicolo et al. | ......... | 370/438 |
| 6,205,153 B1 | * | 3/2001 | Shaffer et al. | .............. | 370/235 |
| 6,219,353 B1 | * | 4/2001 | Wight et al. | ................ | 370/425 |
| 6,222,850 B1 | * | 4/2001 | Johnson | ...................... | 370/445 |
| 6,343,071 B1 | * | 1/2002 | Lansford | ..................... | 370/338 |
| 6,385,210 B1 | * | 5/2002 | Overberg et al. | ............ | 370/447 |

* cited by examiner

Primary Examiner—Hassan Kizou
Assistant Examiner—David Odland
(74) Attorney, Agent, or Firm—James A. Harrison; Bruce E. Garlick

(57) ABSTRACT

An application module, that is part of an electronic assembly including a controller module, is coupled to a backplane bus structure. The backplane comprises a differential bus(s) having a TX and RX data signal, a differential clock signal, and a single ended collision detection line. The application module comprises differential bus transceivers that are controlled by differential bus control logic on the application module. The control logic compares data bits received over a collision detection line with the data bits the application module originally transmitted. If the data is not the same, a collision has occurred and the control logic places the bus transceivers into a high impedance state. A data packet controller on the application module can only detect certain types of collisions that occur in the single ended environment. The control logic enables the data packet controller to recognize a collision that it normally would not.

6 Claims, 6 Drawing Sheets

COLLISION DETECTION ON A DIFFERENTIAL BUS

BACKGROUND OF THE INVENTION

I. Field of the Invention

The present invention relates generally to circuit board intercommunication. More particularly, the present invention relates to detecting collisions over a differential bus in an electronic assembly.

II. Description of the Related Art

Backplane communication links can be very capacitive. A single ended transceiver that is capable of transmitting/receiving over a capacitive backplane may not be able to achieve the same data rates, reliability and ease of use as industry standard off the shelf differential transceivers. This may require single-ended bus circuits to be either on a single circuit board or a limited number of circuit boards very near each other. Single ended transceivers work well in a low capacitive environment.

One way around the impedance and distance limitations is to use differential transceivers to form a differential bus. Some types of differential transceivers are designed for multipoint data transmission environments and work reliably in the presence of noise. Various types of differential transceivers are available as off the shelf parts and require few external parts to function; this makes them easy to use, reliable and less prone to malfunction. The differential bus allows multiple circuit boards to communicate with each other at various distances that are greater than what could be achieved with a single-ended bus. The drawback to this scheme is that a differential bus does not support collision detection the same way a single-ended bus can. There is a resulting need for a high data rate differential bus that handles multiple circuit boards over long distances and can function over a backplane while still supporting collision detection.

SUMMARY OF THE INVENTION

The present invention encompasses collision detection over a differential bus(s). An application module comprising HDLC bus(s) access control logic is implemented in an electronic assembly along with other modules. The application module further comprises a plurality of differential bus transmitters and receivers as well as a data packet controller.

The application module is coupled to a differential bus and collision detection line from a backplane structure. The bus access control logic is coupled to the collision detection line and receives data over this line from a controller module. If the data received on this line is not the same as the data that was transmitted by the application module, a collision has occurred on the differential bus. Depending on the requirements of the pack, if two buses are used there will be connections for two differential buses and two separate single ended collision detection lines.

If a collision is detected on the differential bus, the application module is removed from the bus by the control logic changing the state of the bus transmitters to a high impedance state. The bus access control logic also indicates the collision to the data packet controller (if this type of collision can not be detected by the data packet controller) by pulling a collision detect line into the controller to a low state. The methodology used by the bus access control logic on the application module will depend on the type of differential transceivers used to implement the differential bus and the capabilities of the data packet controller on the application module.

DETAILED DESCRIPTION OF THE PREFERRED EMBODIMENT

The differential bus control logic of the present invention provides collision detection without intervention from the higher level software. The higher level software does not have to monitor the data packet transfers to determine whether any errors occurred.

The HDLC control logic looks for the types of collisions that occur on the differential bus but don't occur on the single ended configuration that the data packet controller was designed for. The built in error detection capability of the data packet controller is still used to detect the types of collisions that it can still detect given that it is being used on a differential bus. The collisions that the data packet controller can independently detect are not duplicated by the collision detection control logic. The data packet controller cannot detect a type of collision described later in the text so the collision detection control logic disables the differential bus transmitters without waiting for any indication from the data packet controller. In fact, the data packet controllers are not even aware that they are coupled to a differential bus. The control logic, clock timing, and overall architecture of the present invention preserves the capability of the collision detection mechanism that is built into the data packet controllers.

The High-level Data Link Control (HDLC) A/B bus of the present invention is a high-speed, inter-card communication link. In the preferred embodiment, the bus is capable of synchronous operation at a sustained data rate of 2 Mbps. However, the present invention is not limited to any one bus, such as the preferred embodiment's redundant HDLC bus. Alternate embodiments use other types of buses such as an original equipment manufacturer (OEM) HDLC bus. The HDLC A/B bus is always used. The OEM HDLC bus can be used as an additional link.

The present invention is not limited to any particular data rate that is discussed herein. However, there is obviously a maximum speed due to timing, device characteristics, and the time to recover from the metastability at the controller module.

Figure 1:
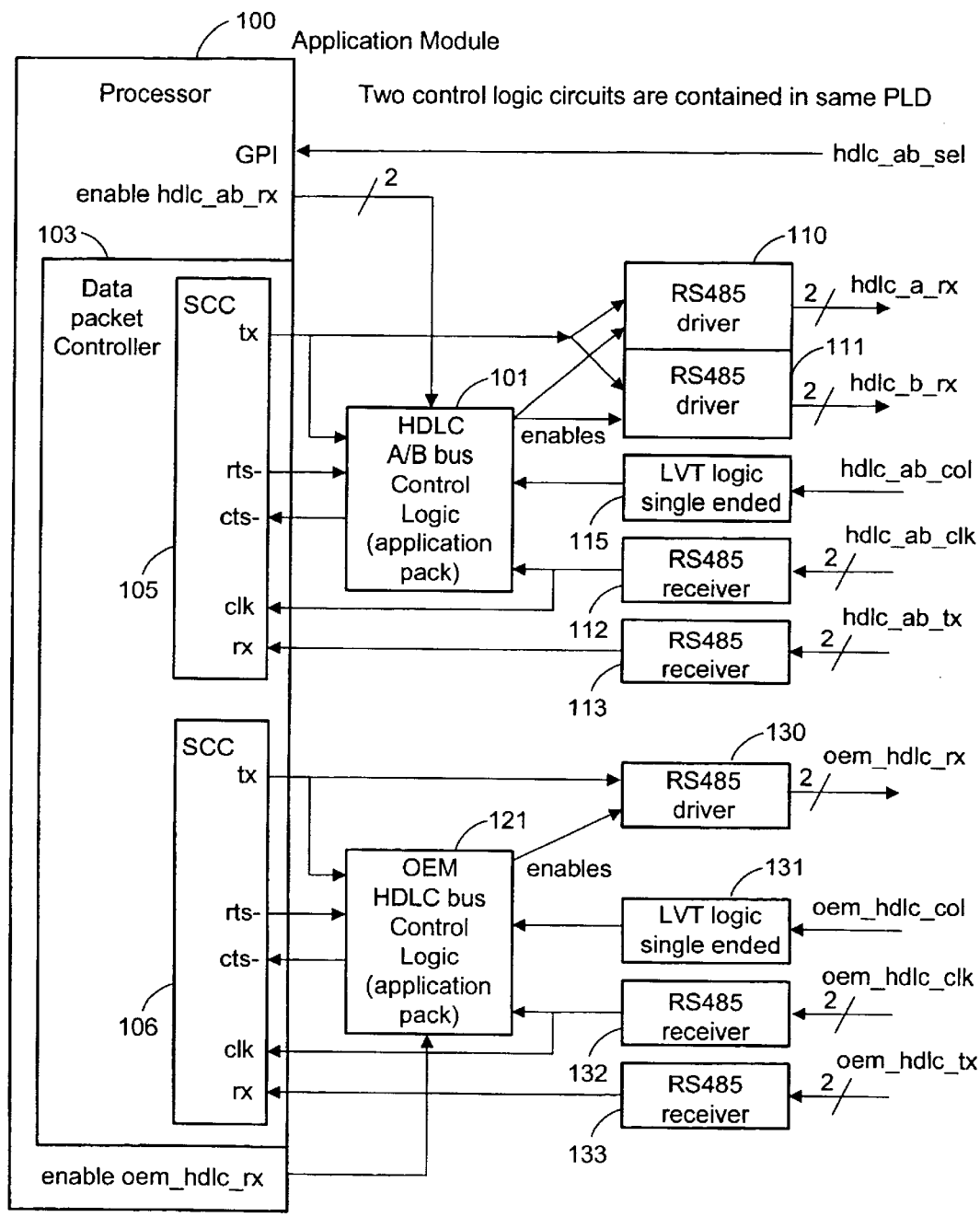
FIG. 1 shows a block diagram of an application module incorporating HDLC A/B bus access control logic of the present invention with the OEM HDLC bus also shown.

FIG. 1 illustrates the preferred embodiment of a block diagram of an application module with HDLC A/B bus access control logic (101) of the present invention. This is only one example of an application module. Other embodiments have other functions and, therefore, other circuitry.

In the preferred embodiment, the application module's processor (100) is comprised of a data packet controller (103). The data packet controller (102) is comprised of two serial communication controllers (SCC) (105 and 106) such as, for example, that which is present in a MOTOROLA MC68360MH device. Each serial communication controller (105 and 106) can be configured independently to implement different protocols for bridging functions, routers, and gateways. Each serial communication controller (105 and 106) can also be configured to interface with a wide variety of standard WANs, LANs, and proprietary networks. The serial communication controllers (105 and 106) have many physical interface options such as interfacing to TDM buses, ISDN buses, and standard modem interfaces.

The application module of FIG. 1 is additionally comprised of multiple differential bus transceivers (110–113) for the HDLC A/B bus and multiple differential bus transceivers (130, 132, and 133) for the OEM HDLC bus. In the preferred embodiment, the differential drivers are RS485 three-state drivers.

The application module also has LVT-type single-ended receiver logic (115 and 131) for the HDLC A/B and the OEM HDLC collision detection lines from the controller module. Alternate embodiments use other types of logic than LVT, but LVT devices can withstand both live insertions and higher input signals that are at a higher potential than Vcc.

The HDLC A/B bus access control logic (101) and the OEM HDLC bus access control logic (121) are coupled to the enable inputs of the bus drivers that connect to the HDLC A/B RX bus and OEM HDLC bus, respectively. The other bus lines do not require controllable drivers since there is no possibility of a collision on these lines.

Due to the similarities and for purposes of clarity, the subsequent discussion focuses on the HDLC A/B differential bus access control logic. The OEM HDLC bus access control logic operates in a similar fashion. In the preferred embodiment, both circuits are included in one programmable logic device. Alternate embodiments use other configurations.

When a collision occurs on the HDLC A/B RX lines due to data of a opposite logic level being transmitted by another application module, the control logic (101) of the present invention configures those drivers (110 and 111) on the module into a high impedance mode. This effectively removes the differential transmitters on the application module from the HDLC A/B RX bus.

Figure 2:
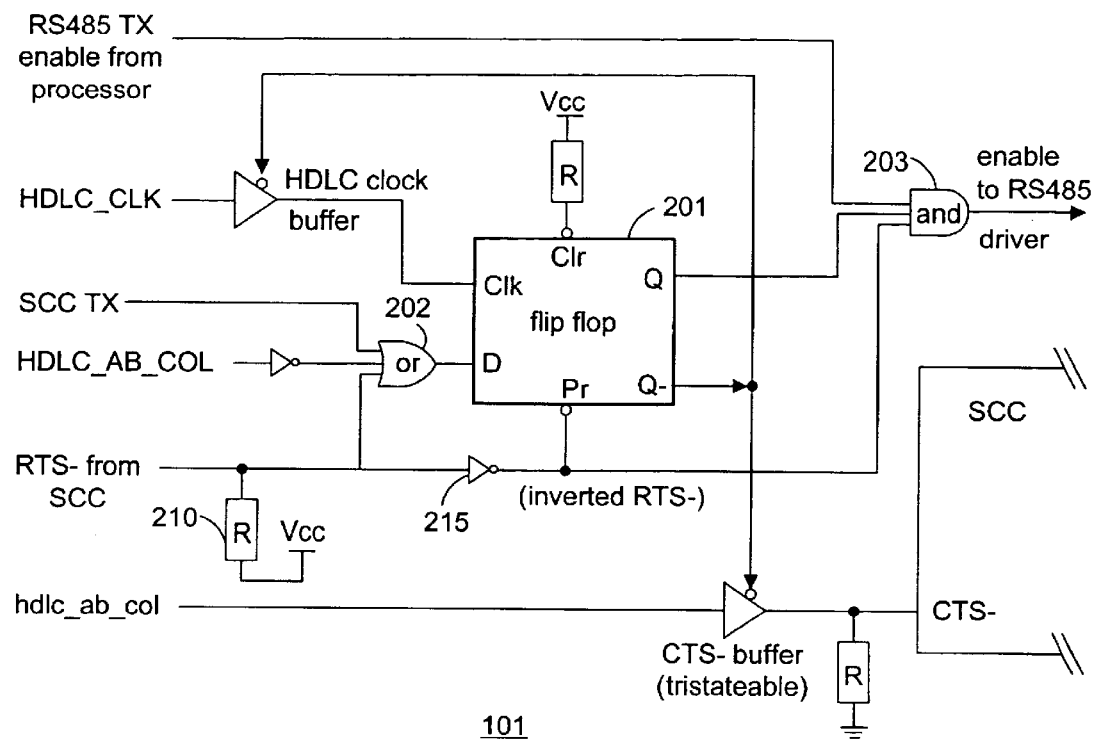
FIG. 2 shows a schematic of a preferred embodiment of the HDLC A/B bus access control logic in accordance with FIG. 1.

FIG. 2 illustrates the HDLC A/B bus access control logic (101) of the present invention. This circuit controls the application modules' access to the bus through the bus drivers. FIG. 2 illustrates the preferred embodiment for the bus access control logic implementation. Alternate embodiments that perform substantially the same control function can be implemented using other circuits.

In the preferred embodiment, the bus access control logic is implemented in the data packet controller. Alternate embodiments implement the functionality in a programmable logic device, microprocessor, or discrete logic.

An example of an alternate embodiment control circuit is a microprocessor with control lines coupled to three state bus drivers. The microprocessor compares the input control signals as described subsequently and changes the mode of the bus drivers as appropriate.

Referring to FIG. 2, the Request to Send (RTS-, active low) line from the serial communication controller controls the operation of the circuit. The clock and data inputs are 'do not cares' until the RTS- signal is a logic low. While the RTS- signal is a logic high, the flip-flop (201) is preloaded with the outputs of Q as a logic high and Q- as a logic low.

When a circuit pack reset occurs, the RTS- signal will be high since the signal is coupled to a pull-up resistor (210). The inverted (215) RTS- signal is also connected to the enable for the RS485 driver. The RS485 driver is enabled high, so until the RTS signal is low, the RS485 drivers will not be enabled. The only time the RTS- signal will be low is when the serial communication controller (serial communication controller, define this since we use the abbreviation and the expanded form?) is transmitting data.

Assuming that the TX enable from the general purpose outputs (gpo) pins of the processor is set to the active high state by the processor, as soon as the RTS- signal is low the flip-flop (201) latches data on the D input on the rising edge of the HDLC Clock. The RS485 driver is also enabled since all the inputs into the AND gate (203) are high.

While the RTS- signal is high and during the period the RTS- signal is low but, without a collision indication from the OR gate (202), the Q- (negative output) output of the flip-flop (201) is low thus enabling the driver on the Clear to Send (CTS-, active low) input of the serial communication controller on the application module. The CTS- input of the serial communication controller is pulled low so that, if the CTS- buffer is disabled, the input of the serial communication controller will see a valid logic low.

Since the RTS- signal is high while the serial communication controller is not transmitting, the CTS- buffer will be enabled and the serial communication controller is able to monitor the single ended collision signal from the controller module via the backplane single signal. The serial communication controller determines if any other application modules are transmitting on the HDLC bus. If no other application modules are transmitting and the serial communication controller has a packet to send, it will start to transmit so as to seize the bus (step 510, FIG. 5.).

When the serial communication controller transmits (RTS- signal level goes low), the RS485 driver will be enabled, the CTS- buffer will be enabled, and the HDLC CLK buffer will be enabled. The flip-flop (201) latches in data and the serial communication controller is checking the link for collisions.

The logic OR gate (202) on the input of the flip-flop (201) only activates in the case where the serial communication controller's TX output is a logic zero and the HDLC A/B COL line is a logic one. The logic is set up this way because this is the case where a collision occurred but the serial communication controller will not be able to determine that it happened since this type of collision does not occur on a single ended architecture. The normal type of collisions that occur on a singled-ended bus are when a devices transmits a logic 1 and sees a logic 0. This occurs because the type of single ended bus that is normally used for these serial communication controller devices is open drain and therefore when a device wants to transmit a logic 1 it does not have to actually drive the signal.

The pullup on the single ended open drain bus keeps the backplane signal level at a logic high when none of the devices are actively driving it low. When a collision occurs and other devices transmit a logic zero, no collision between physical transmitters occurs since the only device that is sourcing current is the transmitter that is sending the logic zero. The logic high is done by the pullup and not by the physical transmitter on any of the serial communication controller. The serial communication controller only looks for the collision case where it transmits a logic 1 and sees a logic 0 because the case of transmitting a logic 0 and seeing a logic 1 will not happen in a singled ended bus architecture. But when the serial communication controller that was designed for a single ended open drain bus is used in a differential bus configuration collisions will occur that the serial communication controller was not designed to handle. The serial communication controller will only know when collisions that it was designed to detect occur and will not notice any other possible types of collisions. This means that collisions will go undetected and backplane communications will suffer as a result of it. This is why the logic described in the previous paragraphs is used to detect any other possible collisions.

In the preferred embodiment, the serial communication controller on the processor for the application module is designed for an open drain interface. In this case, the open drain outputs are only actively driven when the device is transmitting a zero. This means that a logic zero has priority over a logic one.

In the case of a differential bus, each differential driver drives a logic one or a logic zero. Differential drivers have two outputs—a positive output and a negative output. A differential logic one will have a certain relationship between the positive and negative outputs depending on the type of differential driver.

The receiver (at the controller module) looks at both input signals to determine whether the differential signal is a logic one or zero. It then sources a single ended logic one or zero on its single ended output (backplane collision detection signal) depending on the logic level of the differential bus. If there are two application modules driving the differential bus (to the controller module), one device to a logic one and the other application module to a logic zero, it is indeterminate what the controller module will see. The collision detection signal is a recovered version of the data that the application modules transmitted to the controller module. The controller module then drives the collision detection signal with this recovered signal. The application modules monitor the collision detection signal to determine if a collision occurred.

The data that is recovered by the controller module during a collision is dependent on the locations of the applications modules relative to the controller module, the type of differential drivers, temperature, and variation of the parts during manufacturing. They may be other factors that could cause a variation in the result of any collisions. Each vendor's parts will have variations so, depending on whether vendor 'A' parts are on one of the application module and vendor 'B' parts are on the application module, the controller module may see an entirely different value at its inputs. The circuitry needs to be able to reliably detect collisions so that the effective backplane communication data rate can be optimized as much as possible.

If the collision occurs such that the signal levels on the backplane differential signal are invalid, the receiver on the controller module will go metastable for a period of time but will eventually source either a logic one or a logic zero. This is one reason for the clock's 25% duty cycle on the clock. The asymmetrical clock gives time for metastability on the controller module to settle so that, when a rising edge on the bus clock occurs, the collision signal at the input of the data packet controllers on the application modules is a valid logic level.

Each application module that is transmitting compares its transmitted data bit with the collision data signal transmitted back from the controller module over the HDLC A/B COL line. If the collision data bit does not match, a collision has occurred and the serial communication controller will cease to transmit and disable its transmit differential driver. The application module that transmitted the same data bit that was received from the controller module will continue to transmit and will continue to check each data bit for collisions.

The serial communication controller independently retries transmissions of data packets when a collision occurs. The control logic of FIG. 2 ensures that the serial communication controller detects even the specific case where it transmitted a logic zero and saw a logic one on the collision line from the controller. If some type of control circuitry is not used to detect this error state, the serial communication controller could transmit a number of data packets and not detect any collisions even though there were collisions in the differential bus. It is possible since the serial communication controller would not be able to detect the error state collisions that the application modules corrupt each other's data packets this would mean that not a single packet could pass through. If the serial communication controller is not able to detect collisions on layer 1, the higher level software would have to detect for corrupted packets. This may mean that a larger amount of data has to be re-sent than what would have been if the serial communication controller could detect collisions at its level. The retransmission of data packets will lower the effect communication data rate for the overall system so retransmissions should be minimized as much as possible. One goal of the HDLC bus access control logic of the present invention is to reduce the retransmission of these corrupted data packets on the HDLC bus given the overall architecture of the bus. Reducing retransmission of error data packets will increase the efficiency of the HDLC bus.

Another goal of the HDLC bus access control logic is to allow more than one application module to communicate with the controller module. The application modules transmit to the controller module on the same set of differential signals so collisions can occur on these lines. The controller module can transmit to the application modules without worrying about backplane collisions due to the fact that it is the only transmitter on this particular pair of signals. An additional goal of the bus access control logic is to allow collisions to be detected without intervention from the higher level software. The higher level software would not have to have a process dedicated to monitoring the transmitted data packets.

When the TX and collision data match, the bus access control logic does nothing since this is normal communication and there are no issues. If the serial communication controller transmitted a logic one and received a logic zero, the serial communication controller automatically detects this and de-asserts the RTS– signal thus disabling the RS485 drivers.

The serial communication controller then attempts to retransmit the packet of data when the bus is free. The bus access control logic does not have to do anything in this case since the serial communication controller is configured to handle this collision. It is only the collision case previously discussed that the serial communication controller is not able to detect so the bus access control logic disables the RS485 drivers and then inform the serial communication controller of the collision.

The function of the HDLC bus access control logic of the present invention is seamless to the serial communication controller. The serial communication controller does not know that the circuit or the rest of the HDLC architecture exists. The serial communication controller still thinks that it is transmitting on an open drain HDLC bus. When the specific case (error state) occurs where the serial communication controller transmits a logic zero and the HDLC A/BCOL signal is a logic one (due to a collision on the backplane) and the RTS– signal is active (logic zero), the D input to the flip-flop (201) will be a logic zero. The HDLC A/B COL signal is inverted before the OR gate (202) so when the HDLC A/B COL signal is a logic one the actual signal at the input of the OR gate (202) will be a logic zero. Since all the inputs of the OR gate (202) during the specific events outlined in this paragraph will be a logic zero the output of the OR gate (202) will be a logic zero, this is standard binary logic for an OR gate.

The D input of the flip-flop (201) is normally a logic one but when the collision event occurs, the D input will be a logic zero. When the rising edge of the HDLC CLK occurs, the low level on the D input is latched into the flip-flop (201). The Q output of the flip-flop (201) is low and the Q– output is high.

When the Q– output goes high, the CTS– buffer is disabled, the CTS– input of the serial communication controller then constantly reads a logic low regardless of what the controller module is sourcing on the HDLC A/B COL line. The Q output is a logic low, thus disabling the RS485 driver so that no further collisions occur. The HDLC CLK buffer will also be disabled since it is connected to the Q– output of the flip-flop. This will result in no further clocks to the flip flop (201) so the Q and Q– outputs will no longer change if the value of the D input changes. This effectively latches the CTS line in a low state and disables the RS485 driver.

The serial communication controller is not able to detect this error state collision so it will actually keep transmitting the remaining of the bits in the data packet and the RTS– signal will still be active. The serial communication controller will still be getting the HDLC CLK so on the next rising edge it will compare the data it sent out with the CTS– pin which is tied low at this point. If the serial communication controller continues to send a number of zeros, it will not detect any problems, only when it sends a logic one and sees that the CTS– pin is low (logic zero) will it detect a collision.

Even though the error state collision occurred earlier in time, the serial communication controller does not see the collision until it transmits a logic one. It is not important that the serial communication controller did not detect the collision at the exact moment that it occurred. It is only important that it detected the collision before it reached the end of the packet.

The serial communication controller will retransmit the entire packet if there was a problem with the original transmission. Therefore, even though the exact bit when the error state collision occurred was not detected, one of the goals of getting the serial communication controller to retransmit the packet without having to get any higher level of software involved has been achieved.

When the serial communication controller finally detects the collision, it will deactivate the RTS– signal (set to logic high). This resets the HDLC bus access control logic to the initial state and re-enables the CTS– buffer. Re-enabling the CTS– buffer allows the serial communication controller to monitor the backplane collision signal. When the serial communication controller sees that the backplane is free, it will attempt to seize the bus again and when it has seized the bus it will start to retransmit the data packet that was corrupted due to the previously mentioned error state collision.

Figure 3:
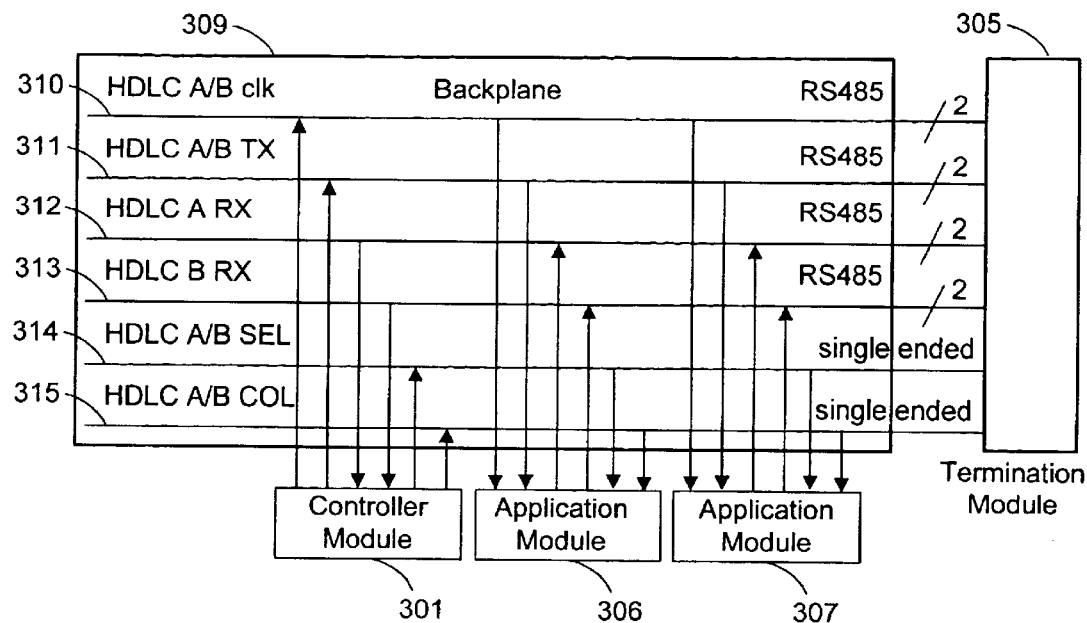
FIG. 3 shows a block diagram of an HDLC A/B redundant bus system.

A high-level block diagram of one use of an application module is illustrated in FIG. 3. FIG. 3 illustrates an HDLC A/B bus system. This system is comprised of a controller module (301), a termination module (305), the application modules (306 and 307), and the HDLC A/B bus structure (309). For clarity, only two application modules (306 and 307) are illustrated. Alternate embodiments use greater or lesser quantities of application modules. The maximum number of application modules depends on the mechanical features of the overall assembly and the type of differential transceivers used since each type of differential transceiver may only support a specific number of devices.

The link from the controller module to the application modules is a point to multi-point link. The link from the application modules to the controller module is a multi-point to point interface The termination module (305) is a bus terminator that provides differential termination on the far right side of each differential bus signal. In the preferred embodiment, the differential termination is a single resistor connected between the two signals of each differential signal that is part of the overall differential bus.

The controller module (301) terminates the left side of the differential signals with a differential resistor similar to the terminator module (305). The controller module also utilizes a pull up and pull down resistor on each differential signal to preset the corresponding single ended logic output of any receiver that may be connected to that differential signal. This is done so that a specific single ended logic state can be chosen as the idle condition when a particular differential signal is not being driven by a differential driver. All receivers should be in a valid logic state even when a particular differential signal is not being actively driven by a differential transmitter.

Figure 4:
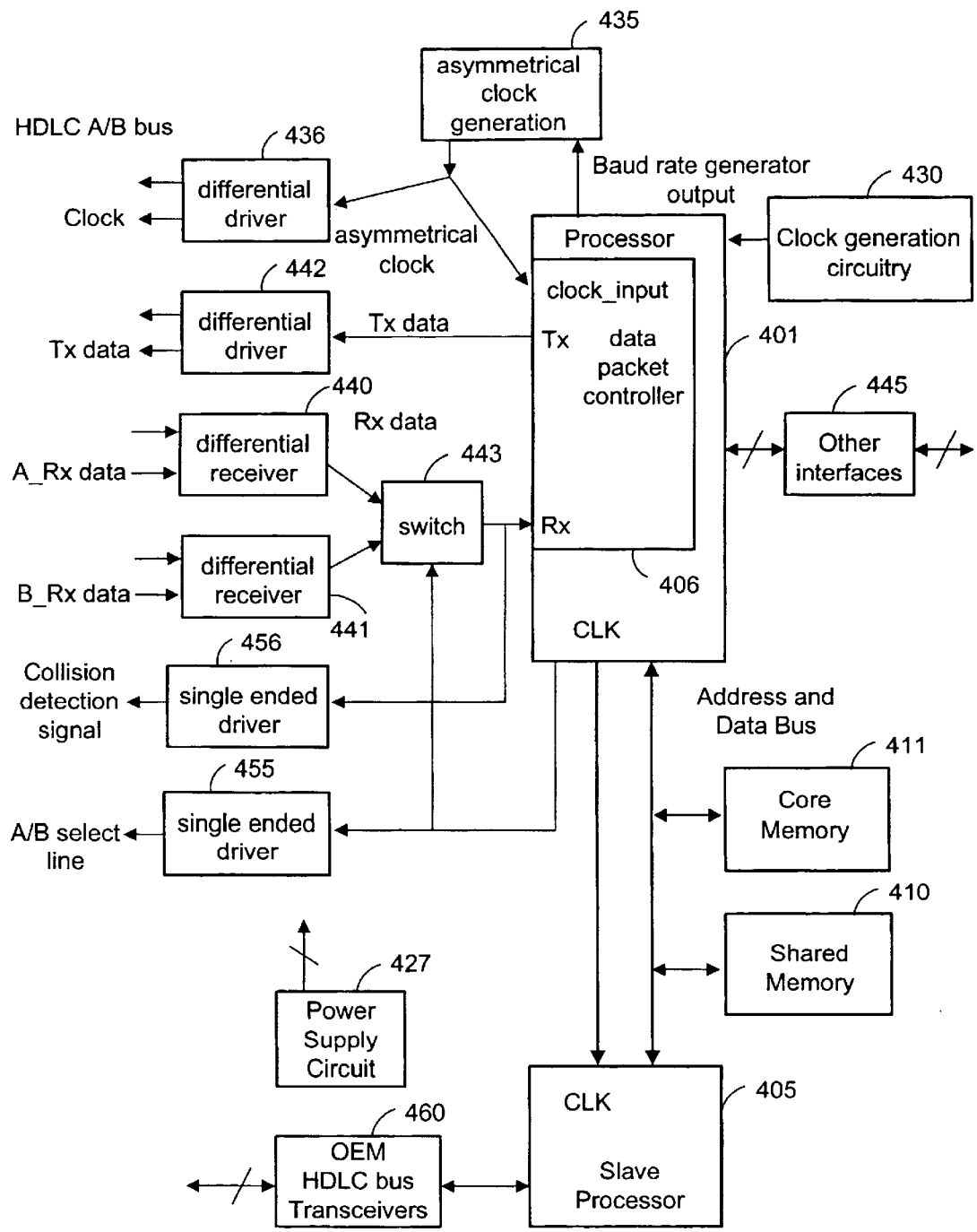
FIG. 4 shows a block diagram of an HDLC A/B bus controller module.

A block diagram of the preferred embodiment of a controller module is illustrated in FIG. 4. The controller module controls the HDLC A/B bus that is connected between the controller module (301) and the application modules (306 and 307) of FIG. 3.

Referring to FIG. 4, the controller module is comprised of a processor (401), such as the MOTOROLA MPC860MH (MH is the multi-channel version of the standard device), and a slave processor (not shown), such as the MOTOROLA MC68MH360. Each processor is comprised of a CPU and a Communications Processor Module. Alternate embodiments use other processors. In the preferred embodiment, the MPC860MH CPU core executes the software code.

The slave processor operates over the OEM HDLC bus. For purposes of clarity, the operation of this processor and the OEM HDLC bus are not discussed further.

The controller module is additionally comprised of various types of memory (410 and 411) for storing values and as a means of exchanging information between the processor (401) and slave processor (405). In the preferred embodiment, the memory (410 and 411) may include SRAM, Flash memory, DRAM, and various registers. One memory block (411) is Flash and DRAM memory. The slave processor does not access this memory. The other memory block (410) is SRAM. Main processor and slave processor share memory via this memory space.

Both the processor (401) and the slave processor (405) have access to a different differential bus through their respective bus transceivers (440–442 and 460). These two differential buses are not synchronous with each other.

The controller module is also comprised of power supply circuitry (427) for supplying power to the controller module (401). A clock generator circuit (430) generates a clock to run the processor (401). A clock output of the processor (401) is used to drive the input clock of the slave processor (405). In this way the two processors (401 and 405) and the data/address bus interfaces are synchronous with each other.

Another clock generator (435) generates the asymmetrical clock, described here and mentioned previously in the text, for transmission through a differential driver (436) to a differential bus. This signal is derived from a clock signal from a baud rate generator in the processor (401) and is used to drive the backplane and data packet controller interface timing. The output of the asymmetrical clock generation block (435) is connected to the HDLC bus interface clock input of the data packet controller so that the data packet controller will be synchronous with the application modules. The bus clock generator circuit (435) takes a clock signal with a 1:1 ratio from the respective processor and converts this waveform into the asymmetrical clock used on the backplane.

The data packet controller (406), located in the processor (401), has an HDLC A/B bus transceiver (440, 441, and 442) for accessing the HDLC A/B differential bus.

An A/B bus select line is driven by a single-ended driver (455). This select line is also used to switch (443) between the A and B receive buses. A single ended driver (456) also drives the collision detection signal on the bus.

The controller module additionally has other types of bus interfaces (445) that enable the processor and slave processor to access other equipment. These interfaces (445) include RS232, 10BaseT, and T1 that are all well known in the art. OEM HDLC bus circuitry (460) is used to connect the controller module to the OEM HDLC bus. Alternate embodiments use other types of interfaces or additional interfaces.

The above description of the controller module is for the preferred embodiment. Not all of the circuitry is required for operation of the differential bus collision detection apparatus of the present invention. Alternate embodiments use other controller module configurations.

The application modules of the present invention, in the preferred embodiment, are used to perform various duties for a cellular radiotelephone cell site. These duties may include communicating between the cell site radios and the public switched telephone network or controlling the radios. The main function of the applications modules of the present invention is to perform OA&M (operational alarms and maintenance activities) and downloading software into cellsite devices. The controller module also connects to a laptop PC (Nortel custom software application) which is also used for commissioning. Alternate embodiments may use application modules for tasks unrelated to radio communication.

The HDLC A/B backplane structure (309) of FIG. 3 is comprised of three data links. These data links are labeled HDLC A/B TX (311), HDLC A RX (312), and HDLC B RX (313). The bus is also comprised of a clock signal, HDLC A/B CLK (310), a single-ended select line HDLC A/B SEL (314), and a single-ended collision signal HDLC A/B COL (315).

RS485 bus drivers drive all of the output differential bus lines, in the preferred embodiment. These drivers are three-state, differential bus transceivers that are well known in the art. Each driver has a control input that disables the device by changing its output to a high impedance mode thereby removing that driver from the bus. RS485 bus receivers are also used to recover the differential signals present on the backplane. Alternate embodiments use other types of drivers to perform the same function as the RS485 drivers.

The controller module uses digital logic gates to drive the single ended signals that are part of the HDLC A/B bus. Each application module uses digital logic gates to buffer the single ended signals that are present on the backplane and are part of the differential buses.

The HDLC A/B TX line (311) is a point to multipoint communications link. The controller module is the only module that transmits on the HDLC A/B TX line (311). Therefore, there will never be a collision on this interface since all the other modules are only listeners and never transmit on this signal line.

The HDLC AB RX lines (312 and 313) are multipoint to point interfaces, each communications link is independent of the other and is designed to provide redundancy. Only one of the interfaces at a time will be actively conveying data, the other interface will not carry any data until it is required. The HDLC A/B RX lines (312 and 313) are used by the application modules (306 and 307) to transmit information to the controller module (301). The application modules monitor the HDLC A/B SEL line (314) to determine which interface is the active link that should be used for communications to the controller module.

As described above, the controller module (301) sources the clock, HDLC A/B CLK (310). In the preferred embodiment, the clock is asymmetrical and has a 25% duty cycle. This allows the maximum amount of time for the HDLC A or B RX signal from the application module (306 and 307) to propagate to the controller module via the RS485 links and then for the data to come back to the application module via the collision detection signal, HDLC A/B COL (315).

The asymmetrical clock also allows time for the metastability that must occur on the receive interface of the controller module (301) to settle before the data is sampled by the controller module and the application modules. This same functionality occurs on the OEM HDLC bus.

Alternate embodiments use other clocks. For example, clocks with duty cycles other than 25%.

Also as described above, the controller module (301) sources the select lines, HDLC A/B SEL (314), and the collision detection signal, HDLC A/B COL (315). The select lines (314) are used by the controller module (301) to instruct the application modules (306 and 307) which side of the HDLC bus is currently active. This lets the application modules know whether to use the A side or B side of the HDLC A/B differential bus to send information to the controller module. These select lines are well known in the art and are not discussed further.

Since the application modules (306 and 307) can transmit at the same time on the HDLC A/B RX lines, it is very likely that collisions between the transmitters of the two application modules will occur. The collision detection apparatus of the present invention feeds back the data the controller module is actually recovering so that each application module (306 or 307) can determine whether a collision has occurred. The controller module does not know how many application modules are transmitting at any given moment. The controller module does not even know that a collision occurred.

The controller module receives data on the HDLC A/B A or B bus and assumes that the data is correct. The controller module does check the overall packet for integrity once an entire packet of data has been received. Since collisions occur when two application modules are transmitting different data at the same time, the data that is received at the controller module will match one of the application modules actual TX data.

It is indeterminate, when a collision occurs on the backplane, what the receiver at the controller module will actually determine the data to be. The recovered logic bit could be a logic high or low. When metastability occurs on the controller module, it does not matter whether a logic one or a logic zero is recovered only that a valid data bit is recognized when the data packet controller on the controller module samples the received data. Since there are so many variables, such as number of application modules, and location of application modules, it is not possible to predict with any certainty what data will be recovered on the controller module when a collision occurs.

The application module(s) that sent data that did not match what was received by the controller module will stop transmitting, wait for the bus to become free again, gain ownership of the bus, and then retransmit the packet. Each application module has an equal opportunity to seize the bus and transmit its data packets to the controller module.

Metastability is an important aspect of the present invention. Digital designs typically avoid metastability so that logic errors will not occur in the system. This invention permits metastability to occur since this is what allows the collision detection of the present invention to operate on a differential bus architecture.

By connecting two or more differential drivers onto one differential signal and allowing them to broadcast at the same time means that metastability will occur at the differential receivers that are connected to this differential signal.

The number of collision occurrences on the backplane determines how many metastable events will occur. If there is only one application module in the system, a collision will not occur. If there is more than one application module in the system transmitting data to the controller module, collisions on the differential bus will be statistically linked to the number of application modules and the numbers of packets being transmitted at any one moment.

Metastability will not occur in the differential receiver on the controller unless a collision occurs on the differential signal of the backplane. The differential receivers incorporate digital logic circuitry to drive the single ended receive signal. It is somewhere in this differential receiver and its associated internal digital logic that metastability will occur.

Metastability is accounted for in the overall timing of the system and is given time to happen and settle. The asymmetrical clock allows metastability to occur without causing any negative effects on the overall data communication links. Any particular metastable event will not last forever. The digital logic receiver, after some period of time, will source a valid logic high or low. The present invention does not care whether the digital logic receiver sources a logic high or low only that the time period for each metastable event is minimized.

As long as the metastability does not affect the overall system it will not have a negative affect on data communications even though it may happen on a regular basis. The fact that metastability will not last forever and that the logic in the differential receiver located on the controller will source a valid logic signal after a period of time is well know in the art. The time period for metastability varies depending on the type of differential transceivers used and the various circuit conditions.

The amount of time for metastability to settle statistically covers a range where the majority of metastability occurrences will be within a nominal minimum and maximum range. As long as the overall timing budget for the system allows for this metastability timing range, the occurrence of metastability will not affect the operation of the system. The system timing should have some margin to allow for situations where metastability may take longer to settle or other timing parameters may extend to the maximum value.

Figure 5:
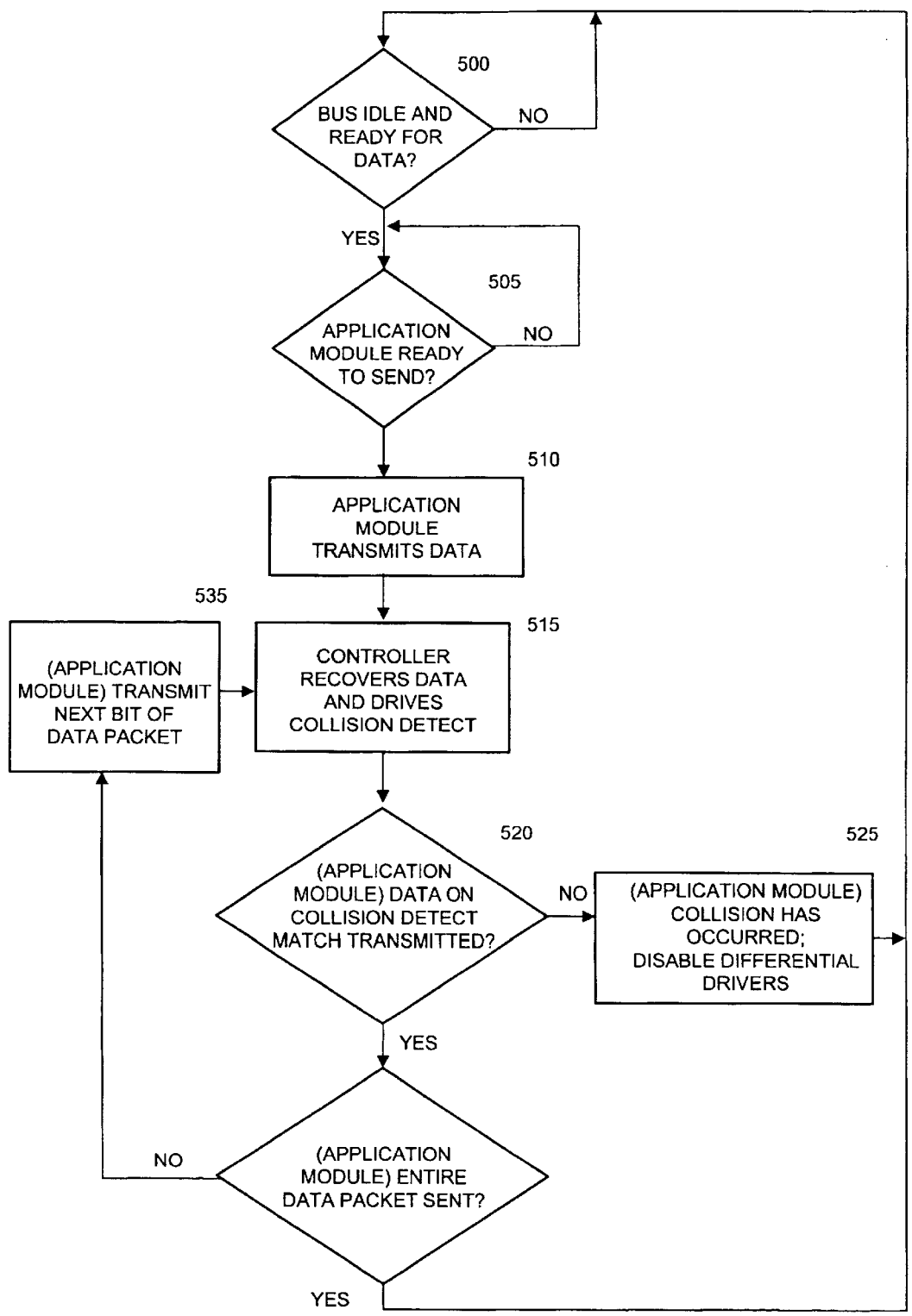
FIG. 5 shows a flowchart of a collision detection process of the present invention.

FIG. 5 illustrates a flowchart for the collision detection process of the present invention. This process begins with the bus being idle and ready for data to be transmitted (step 500). Either one or all of the application modules may have data to transmit (step 505). At some point an application module(s) will start to transmit on the bus (step 510). The data packet controllers wait for the bus to be free but several devices may transmit at the same time since they have equal priority to the bus.

The controller module then receives (transmit lines are serial so data is sent one bit at a time) the data that was transmitted (step 515). The controller module retransmits the recovered data back to the application modules (step 515) over the collision detection line. If no collision occurred during the transmission, the data on the collision detection line will match the data that was transmitted (step 520). If a collision has occurred (step 525), the controller module transmits totally random data to the application modules. Given that a collision occurred, the random data will match one of the application modules that is experiencing a collision, since one device must be transmitting a logic low and the other device a logic high for a collision to have occurred.

Each application module compares the data bit that was retransmitted by the controller module to the data bit that the particular application module originally transmitted (step 520). If the data bit matches (step 520), the application module with the matching data bit continues to transmit to the bus (step 535). If the entire data packet has been transmitted (step 530), the process returns to checking for an idle bus (step 500). If the entire data packet has not been transmitted (step 530), the application module transmits (step 535) the next bit of data packet and the controller recovers that data and drives the collision detection line (step 515).

If the data bit does not match (step 520), in other words, there was a collision, that particular application module removes itself from the bus (step 525) as described previously. This process will repeat throughout the entire data packet.

Figure 6:
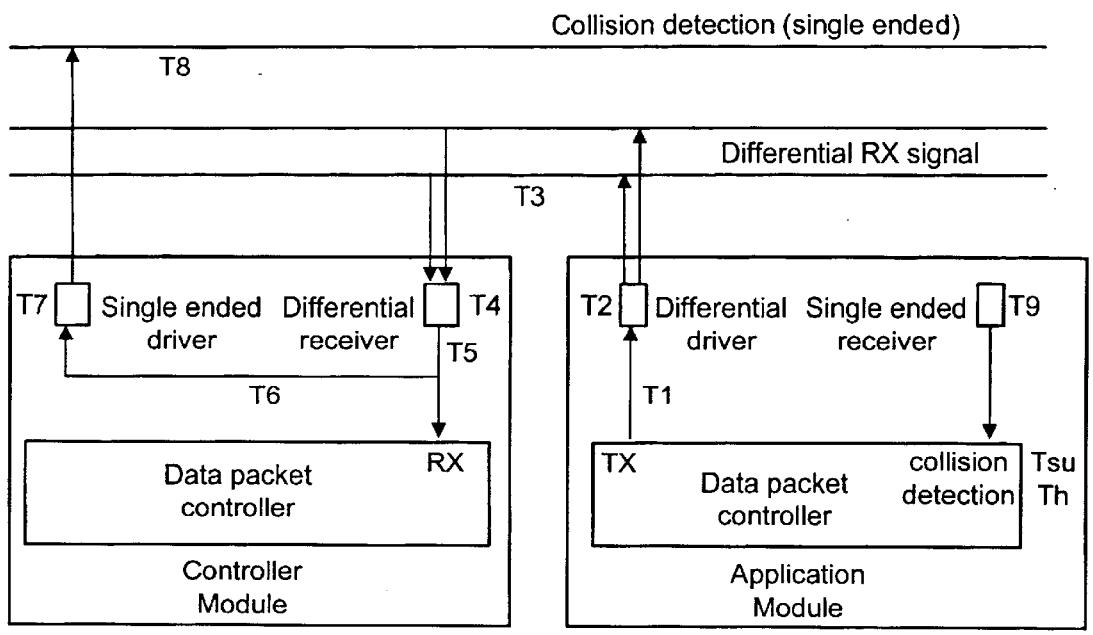
FIG. 6 shows a block diagram illustrating the major time delays in accordance with the present invention.

A block diagram of the controller module and an application module is illustrated in FIG. 6 for timing purposes. This diagram illustrates the major time delays associated with communication between the application module and the controller module. The numerical value of each time depends on the types of devices used, the distances between the devices, the number of modules, temperature, humidity, and other factors.

The time delays are as follows:
T1—Delay of application module to transmit data from the falling edge of the clock.
T2—Propagation delay through the application module differential driver.
T3—Propagation delay across the differential signal on the backplane.
T4—Propagation delay through the controller module differential receiver.

T5—Time for metastability to settle (if there is no collision this may be zero).

T6—Time for recovered data to propagate to the single ended transmitter.

T7—Propagation delay through the controller module single ended transmitter.

T8—Propagation delay across the single ended signal on the backplane.

T9—Propagation delay through the single ended receiver on the application module.

$T_{total}$ is the total of the above timing factors.

Figure 7:
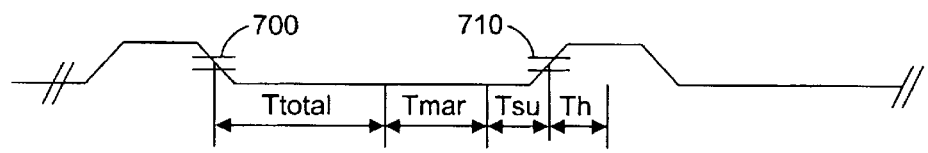
FIG. 7 shows the asymmetrical clock with time delay overlays in accordance with the time delays of FIG. 6.

FIG. 7 illustrates the timing delays of FIG. 6 superimposed on the asymmetrical system clock of the present invention. The application modules transmit data on the falling edge (700) of the clock. $T_{total}$, as discussed above, extends from this falling edge (700).

The setup time, $T_{su}$ required at the application module collision detection input occurs prior to the rising edge (710) of the next clock pulse. This is the clock edge on which the controller latches in data. This is also the clock edge on which the application modules latch in collision data. $T_h$ is the data hold time required at the application module collision detection input.

$T_{mar}$, illustrated in FIG. 7, is the timing margin remaining in the overall timing budget once $T_{total}$ and $T_{su}$ have been taken into account. The period and percentage of asymmetry in the clock can be changed to meet the overall timing requirements of the system.

In summary, the collision detection apparatus of the present invention enables an application module with a data packet controller that was designed for single ended open drain interfaces to operate over a differential bus. The data packet controller functions as if it was communicating over a single ended, open drain interface without any loss of functionality.

The present invention provides a low cost, simple way of connecting data packet controllers to a differential bus that were not designed for a differential bus. By allowing the collision to occur and letting each application module determine whether it was successful in being received, enables the successful module to continue using the bus while the other modules relinquish the bus until the successful module has completed its transmission.

The HDLC control logic recognizes any collision states that the data packet controller can not normally detect. The HDLC control logic allows differential transceivers to be connected to a data packet controller that was designed for a singled-ended bus. The HDLC control logic also acts as a bridge between the two initially incompatible devices: differential drivers and a single ended data packet controller. The differential drivers allow a differential bus to be used for intercard communications.

The present invention does not require the controller module or higher level software to intervene in the communication and collision detection process. The overall invention maximizes the bus's efficiency given the architecture of the bus since not all modules have to cease transmission and retransmit later.

We claim:

1. An electronic application module that detects a collision on a differential bus, the differential bus being part of a bus structure comprising a differential data bus and a collision detection line, the application module comprising:

a plurality of differential bus transceivers coupled to the bus structure, the bus transceivers transmitting and receiving data over the differential data bus whenever an enable input coupled thereto is at an enable state;

a data packet controller coupled to the plurality of differential bus transceivers, the data packet controller for detecting a first collision type on the bus, the data packet controller responding to a detected first collision type by deactivating the enable input to the bus transceivers coupled thereto; and bus access control logic coupled to the plurality of differential bus transceivers for detecting a second collision type and for generating an indication of a detected second collision type to the data packet controller, the bus access control logic comprising:

access control logic for comparing the transmitted data with data received over the collision detection line; and access control logic for controlling the enable inputs in response to the comparison.

2. The electronic application module of claim 1 wherein the bus access control logic includes applying a logic zero to the collision detection input when the comparison indicates that the transmitted data does not equal the data received over the collision detection line.

3. A method for detecting a collision on a differential bus, the method comprising the steps of:

determining whether a first type of collision has occurred on the differential bus; and determining whether a second type of collision has occurred on the differential bus further comprising:
receiving data over the differential bus;
receiving data over a collision detection line;
comparing transmitted data with the received data;
if the transmitted data does not equal the received data, then determining that a differential bus collision has occurred; and
notifying a data packet controller of an error collision state by simulating a predetermined error collision state that the data packet controller can normally detect.

4. The method of claim 3 and further including the step of disabling the differential bus during the collision.

5. The method of claim 3 further including the step of decoupling the differential bus during the collision.

6. An electronic application module that detects a collision on a differential bus, the differential bus being part of a bus structure comprising a collision detection line for indicating an externally detected collision has occurred, the application module comprising:

a plurality of differential bus transceivers coupled to the bus structure, the bus transceivers transmitting and receiving data over the differential bus when an enable input coupled thereto is enabled;

a data packet controller coupled to the plurality of differential bus transceivers, the data packet controller comprising a collision detection input coupled to the collision detection line and transmitting data over the differential bus through the bus transceivers; and bus access control logic coupled to the enable inputs and the collision detection input, the bus access control logic comprising a state machine that enables the data packet controller to interface with the differential bus.

* * * * *